Figure 1:
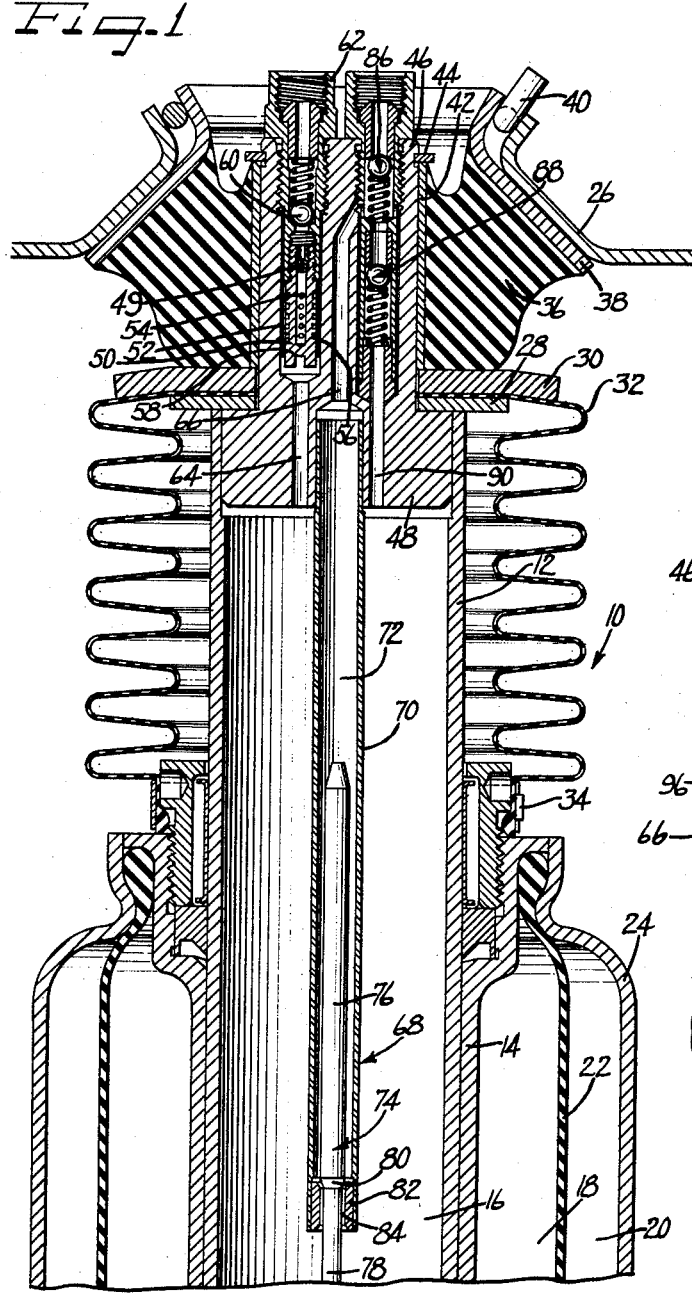

Dec. 1, 1959  J. P. HEISS  2,915,307
LEVELING STRUT
Filed Feb. 7, 1958

Inventor
John P. Heiss
by Hill, Sherman, Meroni, Gross & Simpson Attys

United States Patent Office 2,915,307
Patented Dec. 1, 1959

2,915,307

LEVELING STRUT

John P. Heiss, Flint, Mich., assignor to Thompson Ramo Wooldridge Inc., a corporation of Ohio Application February 7, 1958, Serial No. 713,889

9 Claims. (Cl. 267—64)

The present invention relates to improvements in vehicle supporting or leveling struts controlling by a flow of hydraulic liquid, and more particularly to a shock-proof flow system for such a strut which will prevent damage to the parts from violent forces on the strut, such as are caused by encountering road shocks or the like.

A structure of the type in which the problem of damage due to sudden forces or shocks is encountered is embodied in a hydro-pneumatic spring strut for resiliently supporting a vehicle and leveling the vehicle and adapted for connection between an axle and frame of a vehicle. The strut has a piston slidably reciprocable in a cylinder and defining a level controlling liquid chamber therein. The strut may also embody a compressible and expansible gas chamber which is operatively exposed to the liquid chamber in a manner to transmit pressure forces therebetween so that as the frame of the vehicle moves up and down, the force will be transmitted through the liquid in the liquid chamber to compress the gas in the gas chamber. The gas chamber also affords resilient spring support for the vehicle. The liquid leveling system may, in one form, be the constant flow or leak-down type wherein the escape of liquid from the liquid chamber is regulated by a flow-limiting orifice and the delivery of replacement liquid to the chamber is regulated by a metering valve. Contraction of the strut will open the metering valve to increase the flow into the chamber, thereby returning the strut to its constant level length, and expansion of the strut will close the metering valve to reduce the flow into the liquid chamber, and thereby return the length of the strut to its constant level length. In this manner, the frame of a vehicle is retained at a constant length regardless of changes in the load placed on the frame. In one form, the metering valve will include a valve tube with a valve core projecting therein, and the valve core has sections of different diameters which move relative to an orifice in the tube so as to define maximum and minimum flow levels. The valve core and valve tube move relative to each other with expansion and contraction of the strut to control the flow. With sudden compressive loads on the strut, such as occur when shocks or road obstacles are encountered by the vehicle, the valve core will move rapidly into the tube thereby tending to compress the liquid therein. Since the liquid is substantially incompressible this core movement can cause excessive stress on the valve parts to cause rupture of the valve tube or buckling of the tube and core. A feature of the invention is to provide a liquid system with means to relieve the severe shock pressures and protect the parts from damage.

It is, therefore, an object of the present invention to provide an improved structure and liquid flow system for controlling the flow of a leveling liquid into a leveling strut in which the possibility of damage to the parts with sudden compressive loads on the strut will be avoided.

Another object of the invention is to provide an improved pressure relief mechanism in combination with an automatic leveling liquid system for a resilient vehicle support strut.

Another object of the invention is to provide an improved flow control system for a strut having an automatic leveling feature which is provided with a built-in safety mechanism which will not affect the normal operation of the system.

A further object of the invention is to provide a pressure relief flow system for a self-leveling vehicle support strut employing a telescoping-type needle valve receiving pressurized liquid and wherein pressure surges cannot damage the system or valve.

An object of the invention is to provide an improved strut for resiliently supporting and automatically leveling a vehicle having an improved liquid flow control system which is simple in construction and inexpensive to manufacture and assemble.

Figure 2:
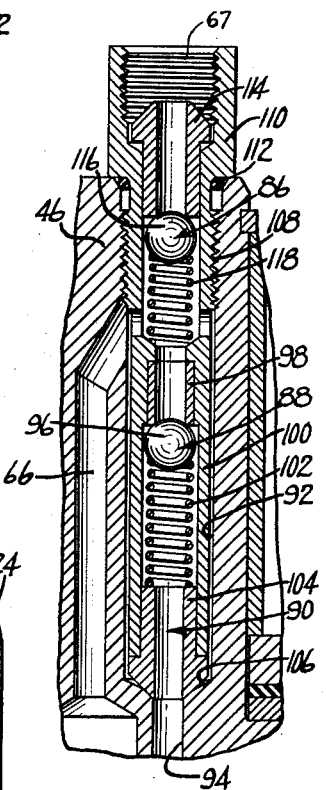

Other objects and advantages will become more apparrent with the teachings of the features and principles of the invention and with the disclosure of the preferred embodiment of the invention in the specification, claims and drawings, in which:

Figure 1 is a vertical sectional view taken through the axis of a vehicle support and leveling strut embodying the present invention; and, Figure 2 is an enlarged detailed sectional view of the pressure relief valve and part of the flow-control system of the strut of Figure 1.

As shown in the drawings:

As illustrated in Figure 1, a supporting strut 10 includes a piston 12 slidably received within a cylinder 14. The piston is hollow and defines a liquid chamber 16 therein with the liquid being free to flow through openings, not shown, in the cylinder 14 to an annular chamber 18 outside of the cylinder.

The liquid of the strut is operatively exposed to a compressible gas maintained in a chamber 20 which is separated from the liquid chamber 18 by an annular rubber bladder 22. The ends of the bladder are suitably locked and sealed as illustrated by the upper end of the bladder which is clamped between the cylinder 14 and the upper end of an outer shell 24, which defines the outer enclosure of the air chamber 20.

The air in the chamber 20 is compressible so that the vehicle frame supported above the vehicle axle will receive resilient support. The strut also affords a constant leveling feature by virtue of the control of the liquid in the chamber 16 of the strut.

The lower end of the strut will be connected to the axle of the vehicle, and the upper end will support a frame 26. In the form illustrated, at the top of the piston 12 is an annular ring 28, and above the ring 28 is another annular ring 30. The rings clamp between them an upper end of an expandible bellows 32 which is clamped at its lower end by a ring 34, and which functions to protect the outer surface of the piston which must slide within the cylinder 14.

Above the ring 30 is a conically shaped rubber mount 36. At the top of the mount is a frusto-conically shaped metal cap 38 which forms a support for the frame 26. The frame is locked against the support by a snap ring 40. The rubber mount is held in place by having an inner metal sleeve 42 which is held down against the top of the ring 30 by a snap ring 44 locking in an annular groove in a cylindrically shaped casting 46. The lower end 48 of the casting is enlarged and fits snugly into the top of the cylinder 12 to seal the end of the cylinder. Flow passageways are formed through the casting with flow controlling elements, as will be described.

The strut 10 is preferably of the constant flow type and the escape of liquid from the chamber 16 is maintained substantially constant by a flow-limiting orifice 49. The orifice is secured at the open downstream end of a filter body 50 which carries a filter screen 52, and which has flow ports 54 leading from recesses 56 beneath the screen to transmit liquid to the flow controlling orifice 49. The escaping flow then passes a check valve 60 to flow out through a hollow carrier member 62 which is removably mounted in the casting 46 and provides a continuation of the liquid escape conduit 64 through the casting leading from the liquid chamber 16.

Liquid is continually delivered to the chamber 16 from a pressure supply pump, not shown. The pressurized liquid enters the strut chamber 16 through a flow passageway 66, and it rate of flow into the chamber 16 is controlled by a metering valve 68.

The metering valve 68 includes a valve tube 70 which has an elongated, axial, hollow flow chamber 72 therein. The valve tube 70 telescopically receives a valve core 74 which projects into the open end thereof. The valve core has a section 76 of larger diameter and a section 78 of smaller diameter joined by a slightly tapering intermediate section 80.

The valve tube 70 has an annular wall insert 82 secured in its lower end defining a flow orifice 84 therethrough. The valve core 74 cooperates with the flow orifice 84 to determine the flow area available for liquid entering the strut chamber 16.

The valve tube 70 is mounted on the strut piston 12, and the valve core 74 is mounted to move with the strut cylinder 14 so that as the strut compresses or extends, the valve tube and valve core will have relative movement. Thus, when the strut is compressed, such as occurs with increased loading on the frame, a reduced portion 78 of the valve core will move into the orifice 84 increasing the flow into the strut chamber 16 to extend the chamber and compensate for the compression of the air in the air strut chamber 20. This will automatically maintain the strut at a constant length to maintain the frame at a constant level with respect to the vehicle axle. If load is removed from the frame, the valve core 74 will move downwardly with respect to the valve tube to move the enlarged portion 76 into the orifice 84, thereby reducing the flow of liquid into the chamber 16, permitting the strut to contract and again maintaining it at a constant length to maintain the frame at a constant level.

It will be observed that sudden compressive loads on the strut will tend to rapidly insert the valve core 74 into the valve 70. For example, if the strut is used on an automobile, if a road shock is encountered such as when the wheel hits a sudden bump, the valve core 74 will be violently forced upwardly into the valve tube 70. This will tend to cause a sudden compression of the liquid in the chamber 72 of the tube. The liquid will be prevented from escaping from the valve tube 70 and the passageway 66 by a check valve 86 which is located in the flow passageway 64 upstream of the metering valve 68.

The check valve 86 is provided to prevent the back flow of liquid from the strut chamber 16, such as when the pump for the pressure system is shut down. The check valve 86 also prevents the liquid from backing up through the passageway 67 leading back to the pump and to other struts which may be connected in the system. Check valve 86 thus prevents liquid back pressures from being transmitted to other struts which would cause them to act improperly and thus isolates the strut 10.

Thus, since the liquid is not compressible, when the road shocks or sudden compressive shocks to the strut are encountered, an excessive pressure will be created within the valve tube 70 which can cause rupture of the tube. This sudden compression of the liquid can also cause a buckling of the tube or a buckling of the valve core 74. This damage which might be caused to the system is prevented by a relief valve 88, as shown in enlarged detail in Figure 2.

The relief valve 88 is located in a relief passage 90 which leads back into the strut chamber 16. When the relief valve 88 opens to relieve sudden shock pressures from the passageway 66, the liquid will flow through the passage 90 back into the chamber 16.

In the structure illustrated in a preferred form, the check valve 86 and the relief valve 88 are accommodated by the strut by drilling an axial bore 92 down into the casting 46, with the bore 92 continued by a smaller bore 94 which opens into the strut chamber 16 and forms a part of the relief flow passage 90. The check valve 88 includes a movable spherical ball 96 which seats against an insert 98 carried in a tubular relief valve sleeve 100. The sleeve holds a calibrated relief spring 102 which urges the relief valve ball 96 to seated position. The spring is held within the sleeve 100 by a board insert 104 which fits up into the discharge end of the sleeve, and seats against a shoulder 106 formed at the end of the bore 92 where it meets the smaller extension 94.

The sleeve 100 is threaded at 108 for purposes of securing it within the bore 92. The sleeve has an enlarged head 110, which seats against the upper surface of the casting 46 and holds a ring seal 112 in place. A seat insert 114 is secured within the upper end of the sleeve and forms a seat for a spherical ball 116 of the check valve 86. The ball 116 is held in place by a token spring 118 which permits the ball to be easily opened with the flow of pressurized liquid through the passageway 64 into the metering valve and down into the strut chamber 16.

The spring 102 for the relief valve ball 96 is calibrated so that the ball will be held against its seating member and will not open during normal delivery pressure of the liquid in the passageway 66. However, at pressures above normal operating pressure, the ball 96 will be forced away from its seat so as to relieve pressures from the passageway 66 and permit the liquid to flow down through the passage 90.

In operation of the strut, a supply of pressurized liquid is delivered to flow through the passageway 66 down into the chamber 72 within the valve tube 70 of the metering valve 68. The valve core 74 will move relative to the valve tube 70 in accordance with the compression of the strut, and the larger diameter portion 76 and the smaller diameter portion 78 will cooperate with the orifice 84 to regulate the flow into the strut chamber and maintain the strut at a constant level above the axle of the vehicle. A constant rate of escape of liquid from the chamber 16 is permitted by the escape orifice 49. The flow of pressurized fluid through the system and into the strut chamber will force open the ball check valve 86, but the relief valve 88 will remain closed because of the strength of the seating spring 102. When sudden compressive shocks are applied to the strut, the valve core 74 will be suddenly moved up into the valve tube 70, thus compressing the liquid within the chamber 72 within the tube 70. This will close the flow-return check valve 86, and the increased pressure will open the relief valve 88 permitting the compressed liquid to escape through the escape conduit 90, thus preventing damage to the metering valve 68.

Thus, it will be seen that I have provided an improved flow system for an automatic leveling strut which avoids the damage that can be caused by shock loads on the strut, and which meets the objectives and advantages hereinbefore set forth.

The relief valve arrangement is simple in operation and construction, and will not interfere with the normal operation of the system. Further, its action is automatic and sure, and inasmuch as the relief valve automatically closes and the relieved liquid flows into the strut chamber, continued operation of the strut can resume without resetting or adjustment of the device. It will be observed that while the mechanism is shown in its preferred combined form, the features of the invention may be combined in other environments utilizing their inherent advantages.

I have, in the drawings and specification, presented a detailed disclosure of the preferred embodiment of my invention, and it is to be understood that I do not intend to limit the invention to the specific form disclosed, but intend to cover all modifications, changes and alternative constructions and methods falling within the scope of the principles taught by my invention.

I claim as my invention:

1. A vehicle leveling strut having a shock-proof flow system comprising a longitudinally expandible and contractible strut having a liquid chamber therein adapted to receive a flow of liquid in a quantity determinate of the length of the strut and adapted for connection between the axle and frame of a vehicle, means for delivering a supply of pressurized hydraulic liquid to said chamber including a flow passageway communicating with said chamber, a metering valve connected between the flow passageway and chamber and having a tubular flow accommodating valve member connected to receive a flow of liquid from said passageway and mounted for movement with one part of the strut and a valve core telescopically projecting into said tubular valve member, said core mounted on the other part of the strut to move relative to the tubular member and control the flow therethrough, a check valve upstream of the metering valve in the flow passageway to prevent a back flow of liquid from the strut chamber, a spring biased normally closed pressure relief valve connected to said flow passageway and calibrated to remain closed at normal liquid delivery pressures in said flow passageway and to open and relieve pressure shocks in the flow passageway as when road shocks are encountered to compress the strut and cause the valve core to rapidly move into the tube whereby rupture or buckling of the tubular valve member is prevented, and a passage leading from said pressure relief valve to the strut chamber.

2. A vehicle leveling strut having a shock-proof flow system comprising a longitudinally expandible and contractible strut having a liquid chamber therein adapted to receive a flow of liquid in a quantity determinate of the length of the strut and adapted for connection between the axle and frame of a vehicle, means for delivering a supply of pressurized hydraulic liquid to said chamber including a flow passageway communicating with said chamber, a metering valve connected between the flow passageway and the chamber and having a tubular flow accommodating valve member connected to receive a flow of liquid from said passageway and mounted for movement with one part of the strut and a valve core telescopically projecting into said tubular valve member, said core mounted on the other part of the strut to move relative to the tubular member and control the flow therethrough, a check valve upstream of the metering valve in the flow passageway to prevent a back flow of liquid from the strut chamber, and a spring biased normally closed pressure relief valve connected to said flow passageway and leading to a location for releasing the liquid, said relief valve calibrated to remain closed at normal liquid delivery pressures in said flow passageway and to open and relieve pressure shocks in the flow passageway as when road shocks are encountered to compress the strut and cause the valve core to rapidly move into the tube whereby rupture or buckling of the tubular valve member is prevented.

3. A vehicle leveling strut having a shock-proof flow system comprising a longitudinally expandible and contractible strut having a liquid chamber therein adapted to receive a flow of liquid in a quantity determinate of the length of the strut and adapted for connection between the axle and frame of a vehicle, means for delivering a supply of pressurized hydraulic liquid to said chamber including a flow passageway communicating with said chamber, a metering valve located to control flow of liquid in said passageway to determine the length of the strut and the level of the frame above the axle, means upstream of said metering valve preventing the back flow of liquid from the chamber through said flow passageway, a pressure relief means upstream of said metering valve and separate from said valve and downstream of said back flow preventing means to relieve pressure shocks through the liquid with road shocks or the like to the strut, and a passage leading from said pressure relief means directly to said chamber whereby relieved liquid flows to said chamber.

4. A vehicle leveling strut having a shock-proof flow system comprising a longitudinally expandible and contractible strut having a liquid chamber therein adapted to receive a flow of liquid in a quantity determinate of the length of the strut and adapted for connection between the axle and frame of a vehicle, means for delivering a supply of pressurized hydraulic liquid to said chamber including a flow passageway communicating with said chamber, a metering valve located to control the flow of liquid in said passageway to determine the length of the strut and the level of the frame above the axle, means upstream of said metering valve preventing the back flow of liquid from the chamber through said flow passageway, and a pressure relief means upstream of said metering valve and separate from said valve and downstream of said back flow preventing means to relieve pressure shocks through the liquid with road shocks or the like to the strut.

5. A vehicle leveling strut having a shock-proof flow system comprising a longitudinally expandible and contractible strut having a liquid chamber therein adapted to receive a flow of liquid in a quantity determinate of the length of the strut and adapted for connection between the axle and frame of a vehicle, means for delivering a supply of pressurized hydraulic liquid to said chamber including a flow passageway communicating with said chamber, a metering valve located to control the flow of liquid in said passageway to determine the length of the strut and the level of the frame above the axle, and a pressure relief means upstream of said metering valve and separate from said valve to prevent damage to said valve and passageway with road shocks or the like transmitted through the liquid.

6. A vehicle supporting and leveling strut having a shock-proof liquid flow system comprising in combination an expandible and contractible support strut having an expansible liquid chamber therein to receive a flow of control liquid in a quantity to determine the operative length of the strut, said strut adapted for connection between the axle and frame of a vehicle, means for delivering a continuous supply flow of pressurized hydraulic liquid to said strut chamber including a flow passageway communicating with the chamber, a flow restricting orifice leading from the chamber and limiting the rate of flow therefrom, a metering valve located to control the flow of liquid through said passageway into the chamber whereby the quantity in the chamber will be controlled to determine length of the strut and the level of the vehicle frame above the axle, said metering valve including a valve tube connected to one part of the strut and movable therewith and a valve core projecting into the tube and connected to another part of the strut and movable therewith whereby expansion and contraction of the strut will vary the depth of insertion of the valve core into the tube, one of said tube and core members having a varying diameter along its length whereby the flow through the valve will be changed from a predetermined maximum flow to a predetermined minimum flow to retain the strut at a constant length whereby the level of the vehicle frame will be maintained at a constant length regardless of the load thereon, a return flow-preventing check valve upstream in said flow passageway of the metering valve to prevent the flow of liquid from the chamber, and a pressure relief valve communicating with said flow passageway between the metering valve and the check valve and leading to a location for releasing the liquid, said relief valve calibrated to remain closed at normal liquid flow delivery pressures but to open to relieve shock pressures such as when the valve core is suddenly injected into the valve tube with compression of the strut upon encountering road shocks or the like and whereby said relief valve will prevent rupture or buckling of the valve tube or core.

7. A hydro-pneumatic vehicle leveling strut having a damage-preventing flow system comprising a strut member having a relatively slidable piston and cylinder and defining a liquid chamber for controlling the expansion length of the piston and cylinder and also defining a gas chamber operationally exposed to the liquid chamber to permit compressibility of the gas in the gas chamber with change in length of the strut for resilient support of a vehicle, said strut adapted to be connected between the frame and axle of the vehicle for a resilient support and level controlling function, means for accommodating the flow of pressurized hydraulic liquid to the strut liquid chamber including a flow passageway leading into said chamber and a metering valve having a valve tube member receiving a flow of liquid from the passageway and a valve core member projecting into the valve tube member with said members being of varying cross-section to control a flow of liquid to the chamber, said tube member and said core member being individually connected to said piston and cylinder so as to move relatively in telescopic relationship with compression or expansion of the piston and cylinder, a flow controlling orifice leading from the liquid chamber whereby a constant flow through the chamber is accommodated, a ball check valve in said passageway upstream of the metering valve seating in an upstream direction and having a token closing spring whereby back flow of liquid from the chamber will be prevented, a pressure relief passage communicating between the strut chamber and the passageway between the metering valve and the check valve, a pressure relief ball valve in said passage seating toward said flow passageway and adapted to relieve shock and pressures from said passageway with sudden compression of the strut causing insertion of the valve core member into the valve tube member, and a calibrated spring uring said relief valve ball to seated position and calibrated to maintain the relief valve ball seated at normal liquid delivery pressures to permit unseating of the ball at higher shock pressures.

8. A vehicle leveling strut having a shock-proof flow system comprising a longitudinally expandible and contractible strut having a liquid chamber therein adapted to receive a flow of liquid in a quantity determinate of the length of the strut and adapted for connection between the axle and frame of a vehicle, said strut also having a pneumatic gas-filled chamber exposed to said liquid chamber in force-transmitting relationship whereby said strut will afford resilient support for the frame on the axle, means for delivering a supply of pressurized hydraulic liquid to said chamber including a flow passageway communicating with said chamber, a metering valve connected between the flow passageway and the chamber and having a tubular flow accommodating valve member connected to receive a flow of liquid from said passageway and mounted for movement with one part of the strut and a valve core telescopically projecting into said tubular valve member, said core mounted on the other part of the strut to move relative to the tubular member and control the flow therethrough, a check valve upstream of the metering valve in the flow passageway to prevent a back flow of liquid from the strut chamber, a spring biased normally closed pressure relief valve connected to said flow passageway and leading to a location for releasing the liquid, said relief valve calibrated to remain closed at normal liquid delivery pressures in said flow passageway and to open and relieve pressure shocks in the flow passageway as when road shocks are encountered to compress the strut and cause the valve core to rapidly move into the tube whereby rupture or buckling of the tubular valve member is prevented.

9. A vehicle leveling and resilient supporting strut having a shock-proof flow system comprising a longitudinally expansible strut having a liquid chamber therein adapted to receive a flow of liquid in a quantity determinate of the length of the strut and having a compressible gas chamber operatively exposed to the liquid chamber to lend resiliency to the strut, said strut adapted for connection between the axle and frame of the vehicle, a flow passageway leading to the liquid chamber for the supply of pressurized liquid to determine the length of the strut, liquid return preventing means upstream of said passageway, a metering valve in said passageway, metering valve operating means downstream of said passageway and operable to vary the opening of the metering valve with movement of the strut toward closed position with compression of the strut, the liquid in the passageway between the valve and the return flow preventing means tending to compress with compression of the strut, and a pressure relief means connected to the flow passageway between the valve and flow return preventing means and separate of said valve and leading to said liquid chamber for relief of pressure in the passageway to escape to the liquid chamber.

References Cited in the file of this patent

UNITED STATES PATENTS

| 2,621,924 | Panhard | Dec. 16, 1952 |
| 2,802,664 | Jackson | Aug. 13, 1957 |